(12) United States Patent
Kimura et al.

(10) Patent No.: US 10,928,673 B2
(45) Date of Patent: Feb. 23, 2021

(54) DISPLAY DEVICE

(71) Applicant: ALPINE ELECTRONICS, INC., Tokyo (JP)

(72) Inventors: Kosuke Kimura, Iwaki (JP); Hideto Katsunuma, Iwaki (JP); Yukio Hasu, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/538,155

(22) Filed: Aug. 12, 2019

(65) Prior Publication Data
US 2020/0159070 A1 May 21, 2020

(30) Foreign Application Priority Data
Nov. 17, 2018 (JP) .............................. JP2018-216069

(51) Int. Cl.
*G02F 1/13357* (2006.01)

(52) U.S. Cl.
CPC .. *G02F 1/133605* (2013.01); *G02F 1/133603* (2013.01); *G02F 1/133606* (2013.01); *G02F 1/133608* (2013.01); *G02F 2001/133607* (2013.01)

(58) Field of Classification Search
CPC ....... B60Q 3/10; B60Q 3/14; G02F 1/133603; G02F 1/133605; G02F 1/133606; G02F 1/133608; G02F 2001/133607
See application file for complete search history.

(56) References Cited

U.S. PATENT DOCUMENTS

| | | | |
|---|---|---|---|
| 10,551,025 B2* | 2/2020 | Millon | F21S 43/31 |
| 10,717,357 B2* | 7/2020 | Mochizuki | B60K 35/00 |
| 2002/0101738 A1* | 8/2002 | Misaras | B60Q 3/14 |
| | | | 362/487 |
| 2005/0195614 A1* | 9/2005 | Bayersdorfer | G09F 13/22 |
| | | | 362/545 |

(Continued)

FOREIGN PATENT DOCUMENTS

| | | | |
|---|---|---|---|
| CN | 205331900 U | * | 6/2016 |
| JP | 2004-217065 | | 8/2004 |

(Continued)

OTHER PUBLICATIONS

Machine translation of CN 205331900 (Year: 2016).*

(Continued)

*Primary Examiner* — Leah Simone Macchiarolo
(74) *Attorney, Agent, or Firm* — Brinks Gilson & Lione (57) ABSTRACT

A front member having a hue with higher reflectivity is disposed in a support recess of a front support body having a hue with lower reflectivity. A bottom portion of the support recess has rib-shaped boundary portions that separate openings that light emitting elements face. The front member includes front facing portions that cover the front sides of the boundary portions and front openings that face the front sides of the light emitting elements. Light emitted from the light emitting elements is reflected by an inner surface of the front member and surfaces of the front facing portions, which have a hue with higher reflectivity, and is provided to a transmissive display portion.

19 Claims, 7 Drawing Sheets

(56) References Cited

U.S. PATENT DOCUMENTS

| | | | | |
|---|---|---|---|---|
| 2006/0098429 A1* | 5/2006 | Miyasaka | .............. | B60K 37/06 |
| | | | | 362/227 |
| 2006/0203463 A1* | 9/2006 | Inoue | .................... | G01D 11/28 |
| | | | | 362/23.12 |
| 2016/0200247 A1* | 7/2016 | Krishna | ................... | B60Q 3/14 |
| | | | | 362/511 |
| 2018/0290589 A1* | 10/2018 | Buelow | .................... | B60Q 3/64 |
| 2020/0182428 A1* | 6/2020 | Antonipieri | .............. | B60Q 3/14 |

FOREIGN PATENT DOCUMENTS

| | | | | | |
|---|---|---|---|---|---|
| WO | WO-2012036266 A1 | * | 3/2012 | ............ | F21S 41/323 |
| WO | WO-2014087564 A1 | * | 6/2014 | ............. | B60K 35/00 |
| WO | WO-2015015719 A1 | * | 2/2015 | ............... | B60Q 3/76 |

OTHER PUBLICATIONS

Machine Translation of WO 2015015719 (Year: 2015).*
Machine Translation of WO 2014087564 (Year: 2014).*
WO 2012036266 (Year: 2012).*

\* cited by examiner

DISPLAY DEVICE

RELATED APPLICATION

The present application claims priority to Japanese Patent Application Number 2018-216069, filed Nov. 17, 2018, the entirety of which is hereby incorporated by reference.

BACKGROUND

1. Field of the Invention

The present invention relates to a display device that includes light emitting elements and a transmissive display portion that is located in front of the light emitting element in a direction in which the light emitting elements emit light.

2. Description of the Related Art

Japanese Unexamined Patent Application Publication No. 2004-217065 describes a technology related to a vehicle display device.

The vehicle display device includes a diffuse reflector (15), which is a support body that forms an external appearance of the entire device. The diffuse reflector (15) includes a plurality of LED openings (15a) that are arranged in a row. A substrate (14) is fixed to the back side of the diffuse reflector (15), and a plurality of liquid crystal LEDs (20), each of which is located in a corresponding one of the LED openings (15a), are mounted on the substrate (14). A second diffuser plate (19) and a first diffuser plate (18) face the front side of diffuse reflector (15), and a liquid-crystal display device (16) is disposed in front of the first diffuser plate (18).

The vehicle display device operates as follows: when the liquid crystal LEDs (20), which are located in the plurality of LED openings (15a) that are arranged in a row, are switched on, illumination light emitted from the liquid crystal LEDs (20) is diffused by the second diffuser plate (19) and the first diffuser plate (18), and the liquid-crystal display device (16) is illuminated from the back.

Japanese Unexamined Patent Application Publication No. 2004-217065 does not describe the hue of the diffuse reflector (15), which is a support body that forms an external appearance of the entire device.

If the diffuse reflector (15) has a hue that has low reflectivity with respect to LED light, such as black, the diffuse reflector (15) cannot efficiently reflect light, and the liquid-crystal display device (16) cannot be illuminated with sufficiently bright light. Conversely, if the diffuse reflector (15) has a hue that has high reflectivity with respect to LED light, such as white, the entire device is white because the diffuse reflector (15) forms the external appearance of the entire device, and the design of the device is limited. Moreover, light may be reflected by a part where light from the LEDs is not supposed to be reflected, and leakage of light to the outside is more likely to occur.

SUMMARY

Embodiments of the present invention solve the problem described above, and an object of the present disclosure is to provide a display device that can effectively provide light, which is emitted from light-emitting elements, to a transmissive display portion even when a support body has a hue that has low reflectivity.

A display device according to the present disclosure includes a substrate on which a plurality of light emitting elements are mounted, a support body that includes a plurality of openings that are located in front of the light emitting elements in a direction in which the light emitting elements emit light, and a transmissive display portion that is located in front of the light emitting elements and the openings. The support body includes a boundary portion that separates the openings from each other, and each of the light emitting elements mounted on the substrate faces a corresponding one of the openings. A front facing portion is disposed in front of the boundary portion, and a reflectivity of a front surface of the front facing portion with respect to light emitted from the light emitting elements is higher than a reflectivity of a front surface of the boundary portion with respect to the light.

In the display device according to the present disclosure, for example, the boundary portion is a rib that divides an elongated hole formed in the support body into the plurality of openings and separates the openings from each other, and the rib is a reinforcement rib that is integrally formed with the support body so as to couple long sides of the elongated hole to each other.

In the display device according to the present disclosure, preferably, the front surface of the front facing portion includes an inclined surface whose lateral distance from a corresponding one of the light emitting elements gradually increases in a forward direction away from the light emitting element.

Preferably, the display device according to the present disclosure includes a front member including a plurality of front openings that are separated from each other by the front facing portion and an inner wall surface that extends forward from a side of the front opening, an entirety of the front member has a hue that has higher reflectivity than the front surface of the boundary portion, and the front member is fixed to the support body, and each of the front openings is located in front of a corresponding one of the light emitting elements.

In the display device according to the present disclosure, preferably, an entirety of the support body has a hue that has lower reflectivity than the front surface of the front facing portion.

The display device according to the present disclosure may be configured such that, in the support body, the plurality of openings that are separated from each other by the boundary portion are arranged in a row, and, in the front member, the plurality of front openings that are separated from each other by the front facing portion are arranged in a row.

In the display device according to the present disclosure, preferably, the support body has a support recess that is recessed from a front side toward a back side, the openings and the boundary portion are formed in a bottom portion at a back side of the support recess, and the front member is disposed in the support recess.

In the display device according to the present disclosure, preferably, a region of a front surface of the substrate, the region facing the openings, is colored with a hue that has higher reflectivity than the front surface of the boundary portion.

With the display device according to the present disclosure, the support body includes the plurality of openings, and each of the light emitting elements faces a corresponding one of the openings. The openings are separated from each other by the boundary portion that has, for example, a rib-like shape and serves as a reinforcement rib. By providing the boundary portion, the strength of the support body can be increased, and, even when an external force is applied to the support body, deformation of the display portion can be suppressed. Moreover, by disposing the front facing portion in front of the boundary portion and making the reflectivity of the front surface of the front facing portion higher than the reflectivity of the front surface of the boundary portion, even when the boundary portion has a hue that has low reflectivity, light from the light emitting elements can be effectively reflected by the front facing portion and provided to the display portion. Thus, the utilization ratio of light emitted from the light emitting elements can be increased.

In the present disclosure, preferably, the front member includes the front facing portion, the front opening, and the inner wall surface that extends forward from a side of the front opening; and the hue of the entirety of the front member has a higher reflectivity than the hue of the entirety of the support body. With this structure, even when the support body has a black color or the like, light emitted from the light emitting elements can be reflected by the front member, which has a white color or the like, and the light can be effectively provided to the display portion. Because the support body may have a black color or the like, the external appearance of the display device can be improved, and unnecessary leakage of light from the support body to the outside can be suppressed.

DETAILED DESCRIPTION OF THE PREFERRED EMBODIMENTS

Figure 1:
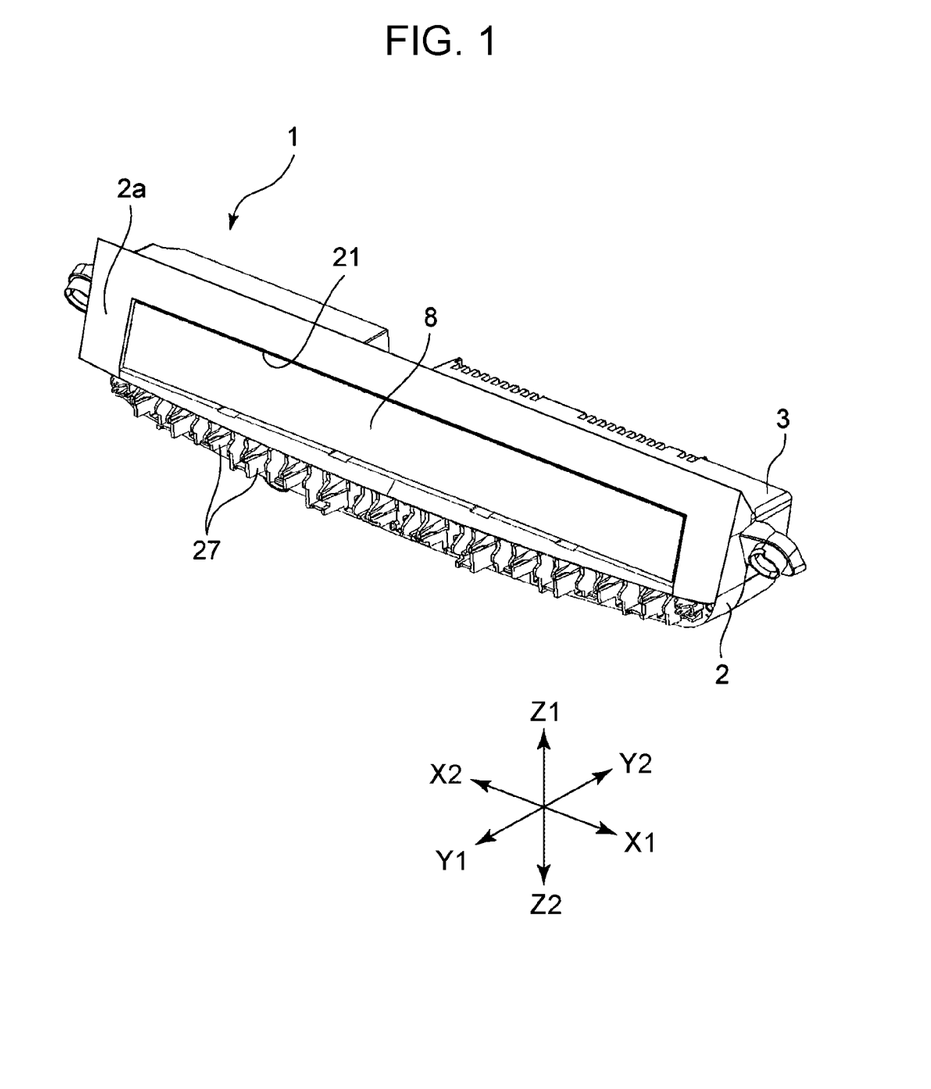
FIG. 1 is a front perspective view of a display device according to an embodiment of the present invention.
Figure 2:
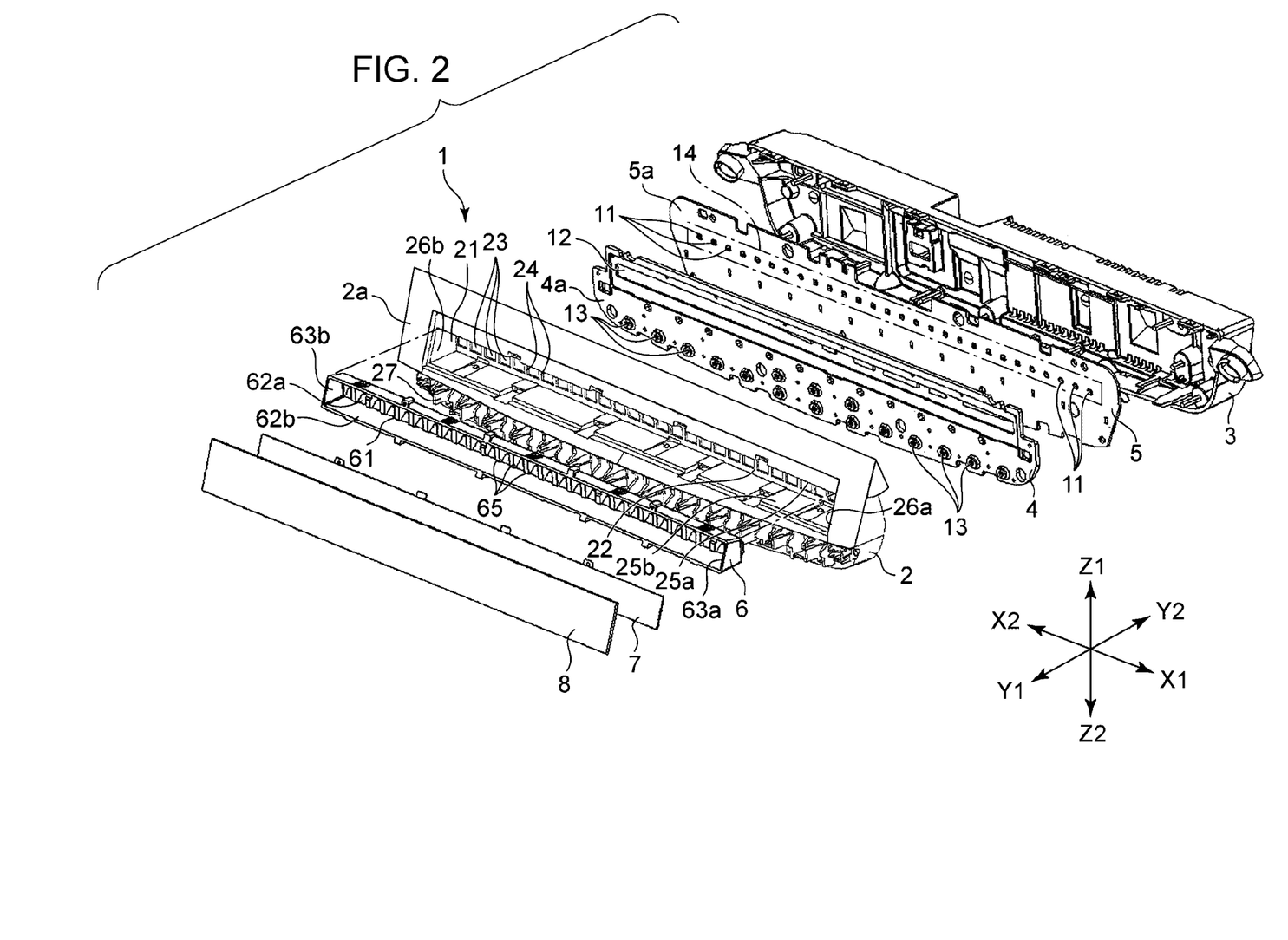
FIG. 2 is an exploded front perspective view of the display device according to the embodiment of the present invention.

FIGS. 1 and 2 illustrate a display device 1 according to an embodiment of the present invention. The display device 1 is a vehicle display device that is used by being embedded in a front instrument panel, a dashboard, or a center console in a passenger compartment of a vehicle. Regarding the display device 1, the Y1 direction is the forward direction of display and the Y2 direction is the backward direction. The X1 direction is the rightward direction, the X2 direction is the leftward direction, the Z1 direction is the upward direction, and the Z2 direction is the downward direction.

Figure 7:
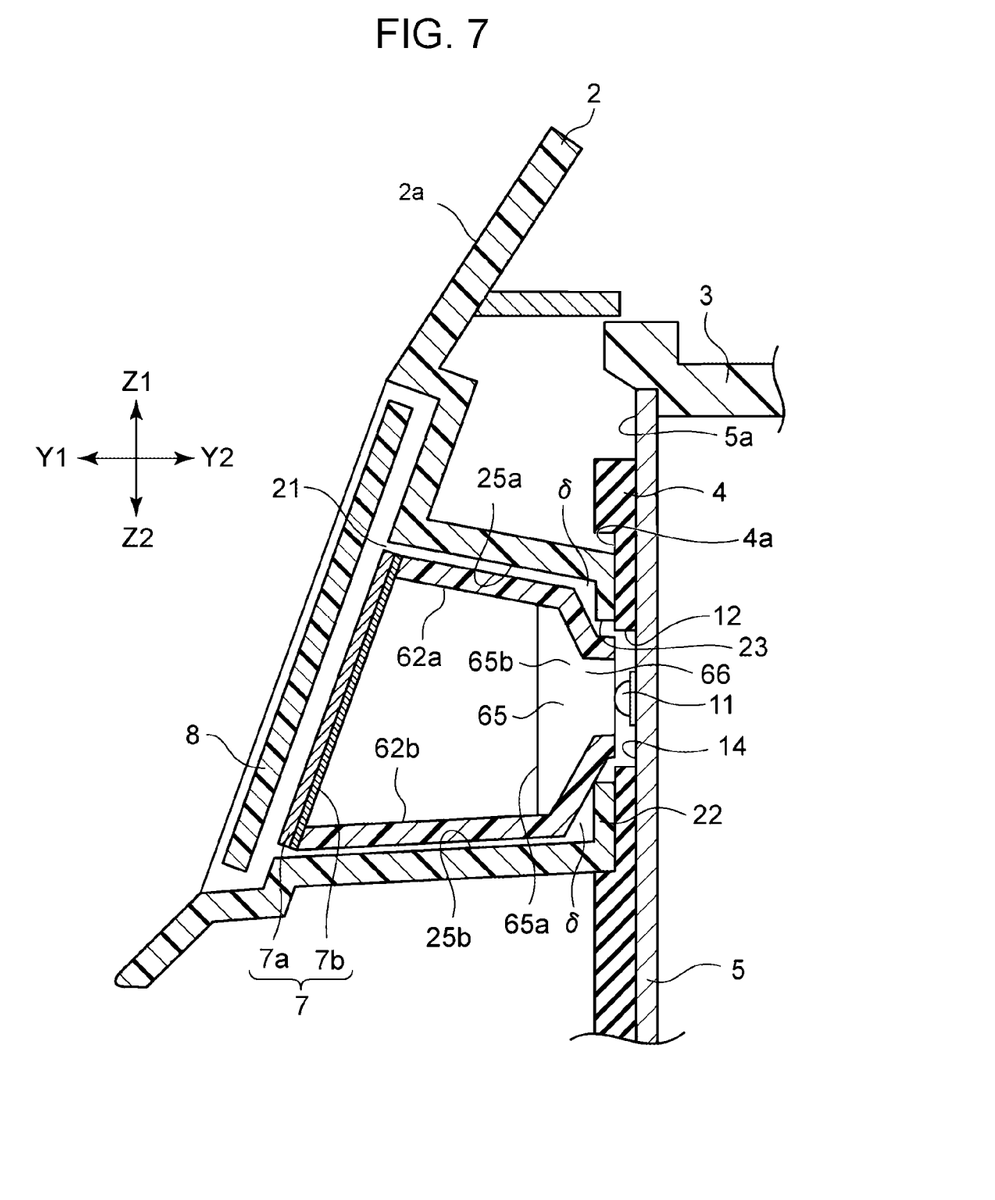
FIG. 7 is a partial sectional view of the display device according to the embodiment of the present invention, taken along line VII-VII in FIG. 3.

As illustrated in FIG. 2, which is an exploded perspective view, the display device 1 includes a front support body 2 and a back support body 3. As illustrated in FIG. 1, the front support body 2 and the back support body 3 are fixed to each other to constitute a support body. The support body is a housing, and the front support body 2 is a part of the support body and is a part of the housing. A rubber switch sheet 4 and an illumination substrate 5 are disposed in the front support body 2 and the back support body 3. As illustrated in FIG. 7, the rubber switch sheet 4 is located at the front (Y1 direction), and the illumination substrate 5 is superposed at the back (Y2 direction). The rubber switch sheet 4 and the illumination substrate 5 are fixed in place by being interposed between the front support body 2 and the back support body 3.

As illustrated in FIG. 2, a plurality of light emitting elements 11 are mounted on a front surface 5a, which faces forward (the Y1 direction), of the illumination substrate 5. The light emitting elements 11 are white LEDs. The light emitting elements 11 are mounted on the front surface 5a so as to be arranged in a row at regular intervals in the left-right direction (X1-X2 direction). The rubber switch sheet 4 has an elongated hole 12 that is continuous in the left-right direction (X1-X2 direction). As illustrated in FIG. 7, when the rubber switch sheet 4 and the illumination substrate 5 are superposed on each other, all of the plurality of light emitting elements 11 are located in the elongated hole 12. A plurality of switch portions 13 are disposed on a front surface 4a, which faces forward (Y1 direction), of the rubber switch sheet 4 below the elongated hole 12. At each of the switch portions 13, a dome-shaped inverted contact is fixed to an inner surface, which faces backward (Y2 direction), of the rubber switch sheet 4; and a fixed contact, which faces the inverted contact, is disposed on the front surface 5a of the illumination substrate 5.

The front support body 2 and the back support body 3 are each formed of a synthetic resin, and the entirety of each of the front support body 2 and the back support body 3 has a uniform hue. As illustrated in FIG. 2, a front member 6, which is also formed of a synthetic resin, is disposed in front of the front support body 2. The entirety of the front member 6 also has a uniform hue. The front member 6 has a hue that has high reflectivity at the surface, compared with the front support body 2 and the back support body 3. For example, the hue of the entirety of the front member 6 is one of white, yellow, gray, and a metallic color; and the hue of the entirety of each of the front support body 2 and the back support body 3 is, for example, one of black, dark green, brown, dark blue, and dark red. The hues of these members are not limited to those listed above, and other hues may be selected, as long as the reflectivity of the front member 6 at the surface is high, compared with the front support body 2 and the back support body 3.

As illustrated in FIG. 2, the front surface 5a of the illumination substrate 5 has a colored region 14 on which the light emitting elements 11 are mounted and that faces at least the elongated hole 12 of the rubber switch sheet 4. The colored region 14 is formed by a printing process. The colored region 14 has a hue that has high reflectivity at the surface, compared with the front support body 2 and the back support body 3. The hue of the colored region 14 is one of white, yellow, gray, and a metallic color, and preferably is the same as the hue of the front member 6.

In the embodiment, the hue of the front member 6 and the colored region 14 can be designated "white", and the hue of the front support body 2 and the back support body 3 can be designated "black".

Figure 4A:
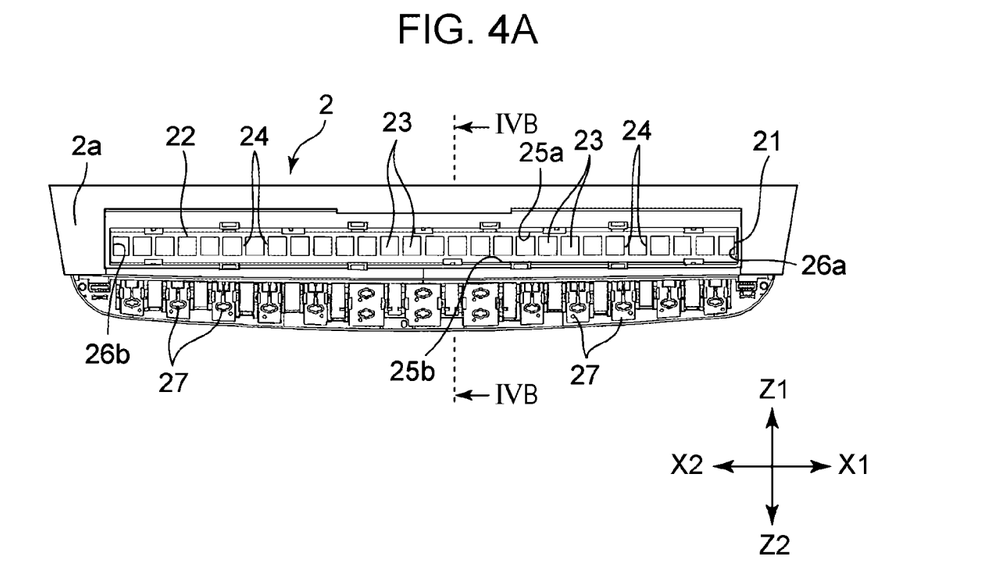
FIG. 4A is a front view of a support body of the display device.
Figure 4B:
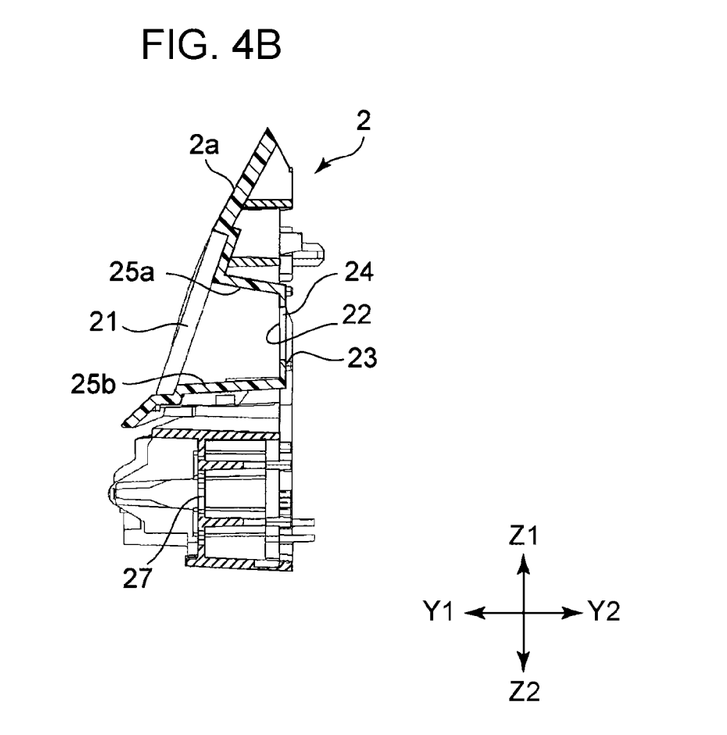
FIG. 4B is a sectional view of the support body taken along line IVB-IVB in FIG. 4A.

As illustrated in FIGS. 1, 2, and 4, a front surface 2a, which faces forward (Y1 direction), of the front support body 2 is a decorative surface and includes a curved portion in an upper part thereof. When the display device 1 is embedded and mounted in a front instrument panel, a dashboard, or a center console of a vehicle, the front surface 2a, which is a decorative surface of the front support body 2, is exposed in a passenger compartment.

The front support body 2 has a support recess 21 that is recessed backward from the front surface 2a. The support recess 21 has an elongated shape such that the opening width in the left-right direction (X1-X2 direction) is larger than the opening width in the up-down direction (Z1-Z2 direction). As illustrated in FIG. 4B, the support recess 21 has a bottom portion 22 at the back. As illustrated in FIG. 4A, the bottom portion 22 has a plurality of openings 23 that are arranged in a row in the left-right direction (X1-X2 direction). The bottom portion 22 has boundary portions 24, which extend in the up-down direction (Z1-Z2 direction), and the boundary portions 24 separate the openings 23 from each other.

Each of the boundary portions 24 has a rib-like shape that has a constant width and that extends in the up-down direction (Z1-Z2 direction). The shape of each of the openings 23, which are separated from each other by the rib-shaped boundary portions 24, is a quadrangle. That is, as illustrated in FIG. 4A, the boundary portions 24 divide an elongated hole, which has a rectangular shape that is elongated in the X1-X2 direction in the bottom portion of the support recess 21, into the plurality of openings 23 and separate the openings 23 from each other. The boundary portions 24 are reinforcement ribs that have high rigidity and that couple the Z1-side long edge and the Z2-side long edge of the elongated hole to each other.

As illustrated in FIG. 7, in a state in which the display device 1 is assembled and the rubber switch sheet 4 and the illumination substrate 5 are superposed so as to be in close contact with each other, the front surface 4a of the rubber switch sheet 4 is in close contact with the bottom portion 22 of the support recess 21 of the front support body 2 from the back. The light emitting elements 11, which are mounted on the illumination substrate 5, are located in the elongated hole 12 of the rubber switch sheet 4. Each of the light emitting elements 11 faces a corresponding one of the openings 23 of the bottom portion 22 of the support recess 21 from the back, or a part of each of the light emitting elements 11 is located in a corresponding one of the openings 23.

The plurality of light emitting elements 11 are arranged in a row in the left-right direction (Y1-Y2 direction). The elongated hole 12 of the rubber switch sheet 4 has a shape that is elongated in the left-right direction. At the bottom portion 22 of the support recess 21 of the front support body 2, the rib-shaped boundary portions 24 are formed at regular intervals in the left-right direction and separate the plurality of openings 23 from each other. Thus, the bottom portion 22 is reinforced by the plurality of boundary portions 24. As a result, the strength of the front support body 2 can be increased, compared with a case where the bottom portion 22 has an elongated opening that is long and continuous in the left-right direction.

As illustrated in FIGS. 4A and 4B, the support recess 21 has an upper inner surface 25a that extends forward from an upper side of the bottom portion 22, a lower inner surface 25b that extends forward from a lower side of the bottom portion 22, a right inner surface 26a that extends forward from a right side of the bottom portion 22, and a left inner surface 26b that extends forward from a left side of the bottom portion 22.

Figure 3:
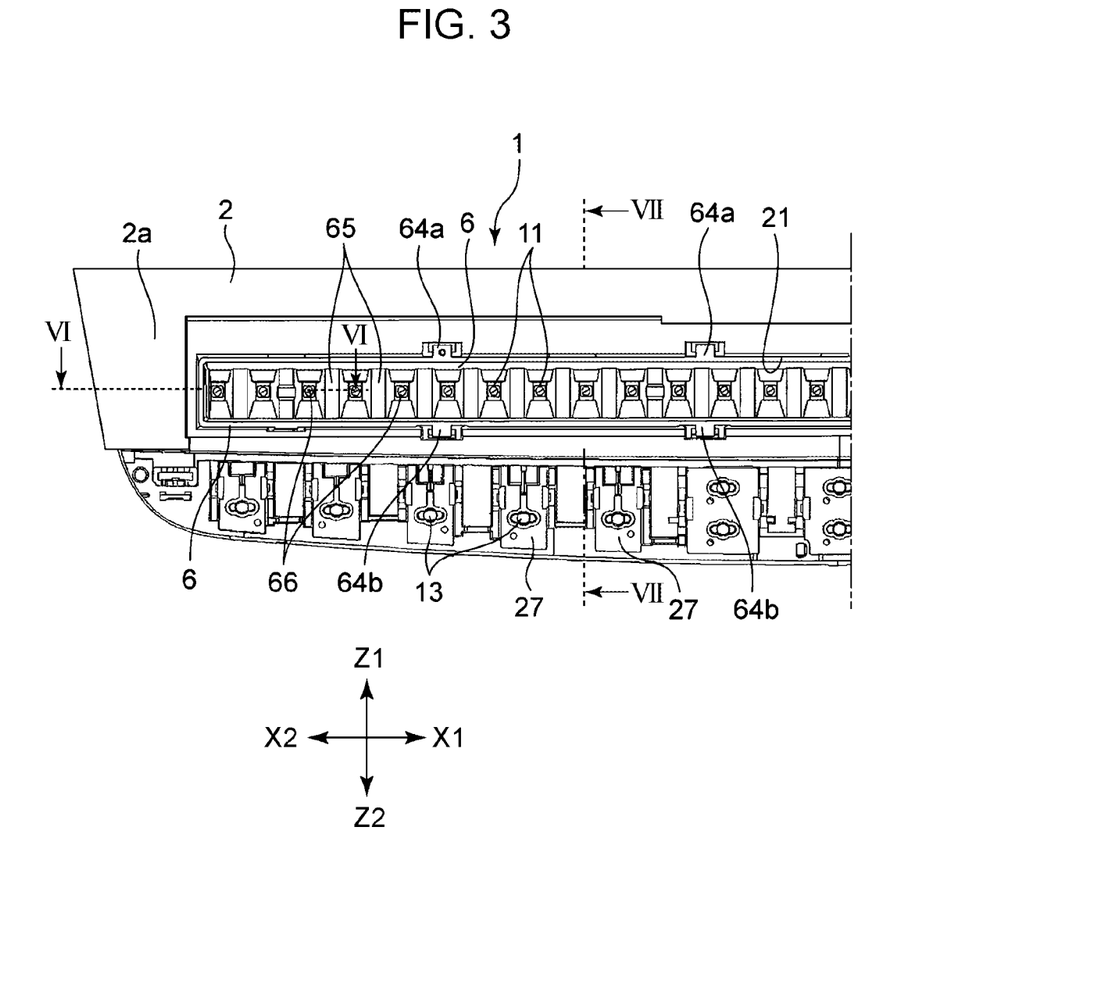
FIG. 3 is a partial front view of the display device according to the embodiment of the present invention.

As illustrated in FIGS. 2, 3, and 4, the front support body 2 has a plurality of button support holes 27 below the support recess 21. The plurality of button support holes 27 are arranged at regular intervals in the left-right direction (X1-X2 direction). Although not illustrated in the figures, an operation button is supported in each of the button support holes 27. When one of the operation buttons is pressed, a corresponding one of the plurality of switch portions 13 of the rubber switch sheet 4 is pressed.

Figure 5A:
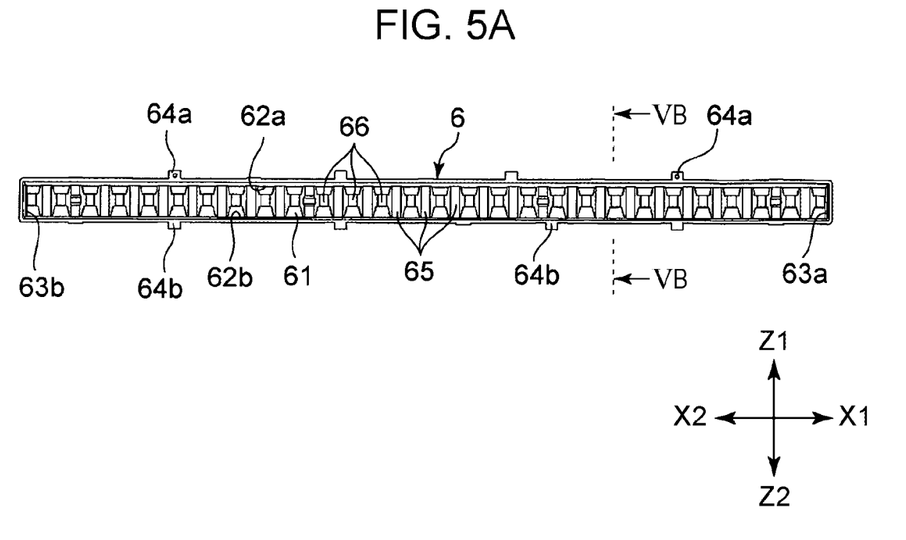
FIG. 5A is a front view of a front member of the display device.
Figure 5B:
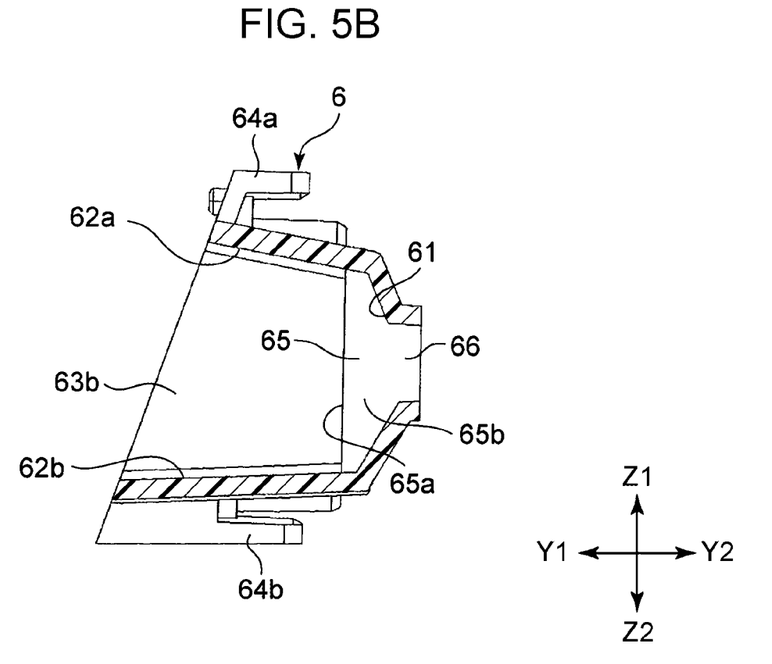
FIG. 5B is a sectional view of the front member taken along long VB-VB in FIG. 5A.
Figure 6:
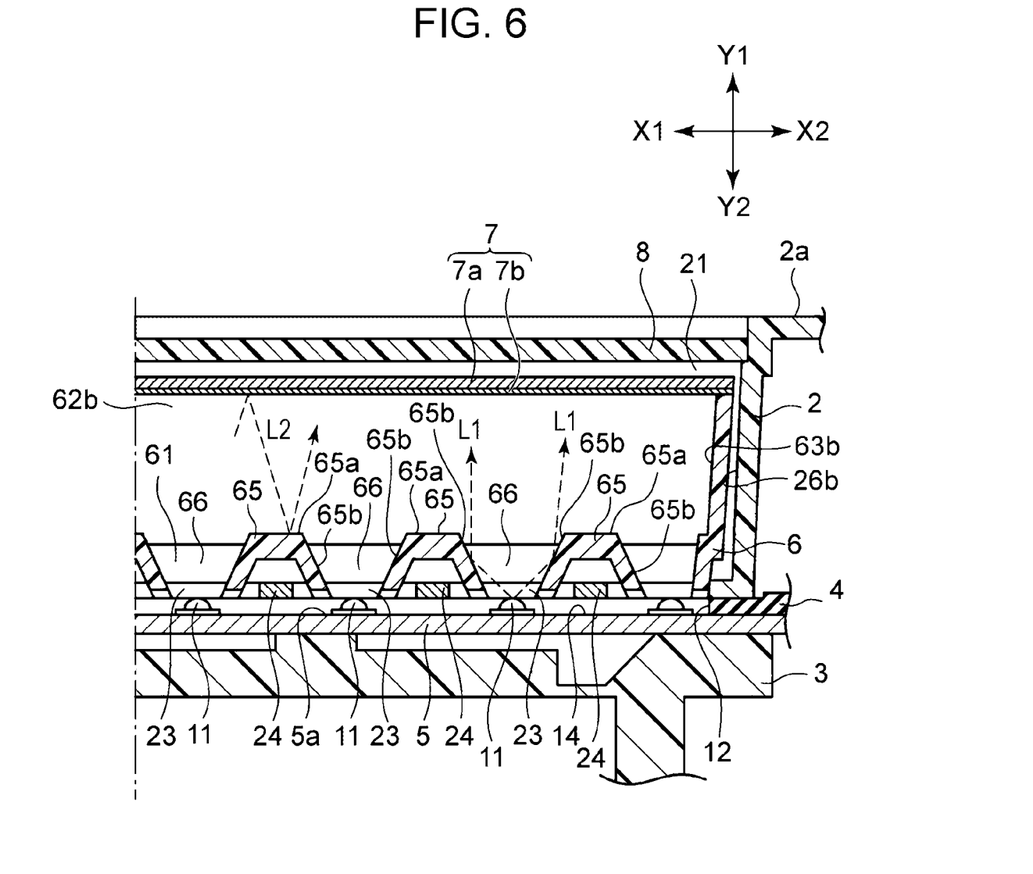
FIG. 6 is a partial sectional view of the display device according to the embodiment of the present invention, taken along line VI-VI in FIG. 3.

As illustrated in FIGS. 2 and 5, the front member 6 has a frame-like shape that is elongated in the left-right direction (X1-X2 direction). As illustrated in FIGS. 5A and 5B, at a front end of the front member 6 in the Y1 direction, a plurality of upper fitting pieces 64a, which protrude upward, and a plurality of lower fitting pieces 64b, which protrude downward, are respectively integrally formed. As illustrated in FIGS. 3, 6, and 7, in a state in which the display device 1 is assembled, the front member 6 is mounted in the support recess 21 of the front support body 2, the upper fitting pieces 64a and the lower fitting pieces 64b are fitted into the front support body 2, and the front support body 2 and the front member 6 are fixed to each other.

As illustrated in FIGS. 5A, 5B, and 6, the front member 6 has a bottom portion 61 on the Y2-side. An upper inner wall surface 62a extends forward from an upper side of the bottom portion 61, and a lower inner wall surface 62b extends forward from a lower side of the bottom portion 61. A right inner wall surface 63a extends forward from a right side of the bottom portion 61, and a left inner wall surface 63b extends forward from a left side of the bottom portion 61.

As illustrated in FIGS. 5A, 5B, and 6, the bottom portion 61 of the front member 6 has a plurality of front facing portions 65 that are arranged at regular intervals in the left-right direction (X1-X2 direction). The bottom portion 61 has front openings 66 that are separated from each other by the front facing portions 65. As illustrated in FIGS. 3 and 6, when the front member 6 is mounted in the support recess 21 of the front support body 2, each of the front facing portions 65 faces the front side of a corresponding one of the rib-shaped boundary portions 24 of the front support body 2. The front openings 66 of the bottom portion 61 of the front member 6 are located in opening regions of the openings 23 in the front support body 2. Each of the front openings 66 is located in front of a corresponding one of the light emitting elements 11. Alternatively, a part of each of the light emitting elements 11 may be located in a corresponding one of the front openings 66.

FIG. 6 illustrates the sectional shape of the front facing portions 65 of the front member 6. A front surface of each of the front facing portions 65 includes a flat front end surface 65a that faces forward (Y1 direction) and an inclined surface 65b whose lateral distance from a corresponding one of the light emitting elements 11 gradually increases in the forward direction away from the light emitting element 11. Each of the front openings 66 has a quadrangular shape, and the opening area of the front opening 66 is smaller than the opening area of each of the openings 23 of the front support body 2.

As illustrated in FIG. 2, a transmissive display portion 7 is disposed in front of the front member 6. As illustrated in FIGS. 6 and 7, the display portion 7 is composed of a transmissive liquid-crystal display cell 7a and a light guide member 7b that is superposed on the back side of the liquid-crystal display cell 7a so as to be in close contact with the liquid-crystal display cell 7a. The light guide member 7b includes a plurality of sheets that are superposed on each other, such as a light guide sheet, a light diffusion sheet, and a lens sheet. As illustrated in FIGS. 6 and 7, the display portion 7, in which the liquid-crystal display cell 7a and the light guide member 7b are superposed on each other, is fixed to the front member 6 so as to completely close an opening at the front end of the front member 6.

As illustrated in FIG. 2, a cover panel 8 is disposed in front of the display portion 7. The cover panel 8 is made of a light-transmissive resin, such as a polycarbonate resin. As illustrated in FIGS. 6 and 7, the cover panel 8 is fixed to the front support body 2 in a state in which the cover panel 8 is located at a distance in front of the display portion 7.

Next, a display operation performed by the display device will be described.

As illustrated in FIGS. 6 and 7, the rubber switch sheet 4 is in close contact with the front surface 5a of the illumination substrate 5, and the front surface 4a of the rubber switch sheet 4 is in close contact with the bottom portion 22 of the support recess 21 of the front support body 2 from the back. Each of the light emitting elements 11 mounted on the illumination substrate 5 is located in the elongated hole 12 of the rubber switch sheet 4. Moreover, each of the light emitting elements 11 faces a corresponding one of the openings 23 of the bottom portion 22 of the support recess 21 of the front support body 2. Therefore, when the light emitting elements 11 are turned on, light emitted from the light emitting elements 11 passes through the elongated hole 12 and the openings 23 and is provided mainly to the inside of the support recess 21 of the front support body 2.

The entirety of the front support body 2 has a hue that has low reflectivity. In the embodiment, the hue is "black", and the front surface 2a, which is a decorative surface, has a good external appearance and has high product quality. The hue of the upper inner surface 25a, the lower inner surface 25b, the right inner surface 26a, and the left inner surface 26b of the support recess 21 is also "black", and reflection of light in the support recess 21 is suppressed. The bottom portion 22 of the support recess 21 has the rib-shaped boundary portions 24, which separate the openings 23 from each other, and the strength of the front support body 2 is increased. If the boundary portions 24 with a "black" hue were exposed from the bottom portion 22, most of light emitted from the light emitting elements 11 and reflected by the light guide member 7b of the display portion 7 would be absorbed by the boundary portions 24, and the amount of light reflected by the boundary portions 24 toward the display portion 7 would considerably decrease.

Therefore, in the display device 1 according to the embodiment, the front member 6 is disposed in the support recess 21 of the front support body 2, and the hue of the entirety of the front member 6 is "white", which has higher reflectivity than the front support body 2, with respect to light emitted from the light emitting elements 11. As illustrated in FIGS. 3, 6, and 7, each of the light emitting elements 11, which are located in the elongated hole 12 of the rubber switch sheet 4, faces a corresponding one of the front openings 66 of the front member 6. As illustrated in FIG. 6, spaces in front of the rib-shaped boundary portions 24 on the bottom portion 22 of the support recess 21 are covered by the front facing portions 65 of the front member 6. The reflectivity of the front surfaces of the front facing portions 65 with respect to light emitted from the light emitting element 11 is higher than that of the front surfaces of the boundary portions 24. Moreover, as illustrated in FIG. 2, the front surface 5a of the illumination substrate 5 has the colored region 14 that faces the openings 23 of the front support body 2 and the front openings 66 of the front member 6, and the hue of the colored region 14 is "white" in the embodiment.

Therefore, light emitted from each of the light emitting elements 11 enters the inside of the front member 6 from a corresponding one of the front openings 66; the light is reflected with high reflectance by the upper inner wall surface 62a, the lower inner wall surface 62b, the right inner wall surface 63a, and the left inner wall surface 63b, which are inner surfaces of the front member 6 and which has a "white" hue; and the light is provided to the display portion 7.

As illustrated in FIG. 6, at the bottom portion 61 of the front member 6, the front facing portions 65, which are "white", face the front sides of the boundary portions 24, which are "black", and the front surface, which faces forward, of each of the front facing portions 65 includes the inclined surface 65b whose lateral distance from a corresponding one of the light emitting elements 11 gradually increases in the forward direction away from the light emitting element 11. Therefore, a component L1 of light emitted from the light emitting element 11 is reflected by the inclined surface 65b of the front facing portion 65 and propagates forward. A component L2 of light emitted from the light emitting element 11, reflected by the light guide member 7b of the display portion 1and returned, is reflected by the front end surface 65a and the inclined surface 65b, which are included in the front surface of the front facing portion 65, and is redirected forward. Light that has returned to the inside of the front opening 66 is reflected by the colored region 14, which has a "white" hue, of the front surface 5a of the illumination substrate 5, and is returned again to the inside of the front member 6.

As illustrated in FIG. 7, the front member 6 is mounted in the support recess 21 of the front support body 2, and the transmissive display portion 7 is fixed to the front end of the front member 6 so as to close the inside of the front member 6. Therefore, light from the light emitting elements 11 is reflected by the inner surface of the front member 6, which is "white", and efficiently provided to the display portion 7, and the display portion 7 can perform display with high brightness.

As illustrated in FIGS. 6 and 7, the front end of the front member 6 is covered by the liquid-crystal display cell 7a, and the liquid-crystal display cell 7a has a "black" hue when the liquid-crystal display cell 7a is not driven. Therefore, as viewed from the front, when the liquid-crystal display cell 7a is not driven, the entirety of the display device 1 has a "black" external appearance. When the liquid-crystal display cell 7a is driven, various display contents in a region surrounded by the "black" parts of the front surface of the front support body 2 are illuminated by the light emitting elements 11. In either of the cases, the external appearance is good, because "white" does not appear when the display device 1 is viewed from the front.

The entirety of the front support body 2 has a "black" hue. Therefore, for example, even when light from the light emitting elements 11 enters a gap δ between the inner surface of the support recess 21 of the front support body 2 and the outer surface of the front member 6 illustrated in FIG. 7, the light does not easily leak to the outside, because the light is absorbed by the front support body 2, which is "black".

In the display device 1 according to the embodiment, the transmissive display portion 7 is composed of the liquid-crystal display cell 7a and the light guide member 7b. However, the transmissive display portion 7 need not have the liquid-crystal display cell 7a. For example, a transmissive display portion may include a non-transmissive panel, which has a "black" hue or the like, at the front end of the front member 6; and the panel may have light transmitting parts that have a "white" hue or the like and that represent fixed display contents, such as characters, symbols, or patterns. With such a display portion, when the light emitting elements 11 are turned on, the characters, symbols, or patterns of the panel are illuminated from the back by light emitted from the light emitting elements 11 and displayed.

In the embodiment, the light emitting elements 11, the openings 23, and the front openings 66 are each arranged in a row in the left-right direction (X1-X2 direction). However, these may be disposed in a plurality of columns in the up-down direction (Z1-Z2 direction), and may be arranged in a plurality of rows as a whole.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display device comprising:
   a substrate on which a plurality of light emitting elements are mounted;
   a support body that includes a plurality of openings that are located in front of the light emitting elements in a direction in which the light emitting elements emit light;
   a front member that is mounted in a support recess of the support body; and
   a transmissive display portion that is located in front of the light emitting elements and the openings,
   wherein the support body includes a boundary portion that separates the openings from each other, and each of the light emitting elements mounted on the substrate faces a corresponding one of the openings, and
   wherein a front facing portion of the front member faces the boundary portion, a front surface of the boundary portion is covered by the front facing portion, and a reflectivity of a front surface of the front facing portion with respect to light emitted from the light emitting elements is higher than a reflectivity of the front surface of the boundary portion with respect to the light.

2. The display device according to claim 1, wherein the boundary portion is a rib that divides an elongated hole formed in the support body into the plurality of openings and separates the openings from each other, and the rib is a reinforcement rib that is integrally formed with the support body so as to couple long sides of the elongated hole to each other.

3. The display device according to claim 1, wherein the front surface of the front facing portion includes an inclined surface whose lateral distance from a corresponding one of the light emitting elements gradually increases in a forward direction away from the light emitting element.

4. The display device according to claim 1, wherein:
   the front member includes a plurality of front openings that are separated from each other by the front facing portion and an inner wall surface that extends forward from a side of the front opening,
   an entirety of the front member has a hue that has higher reflectivity than the front surface of the boundary portion, and
   the front member is fixed to the support body, and each of the front openings is located in front of a corresponding one of the light emitting elements.

5. The display device according to claim 4, wherein an entirety of the support body has a hue that has lower reflectivity than the front surface of the front facing portion.

6. The display device according to claim 4, wherein, in the support body, the plurality of openings that are separated from each other by the boundary portion are arranged in a row, and, in the front member, the plurality of front openings that are separated from each other by the front facing portion are arranged in a row.

7. The display device according to claim 4, wherein the support body has a support recess is recessed from a front side toward a back side of the support body, and the openings and the boundary portion are formed in a bottom portion at a back side of the support recess.

8. The display device according to claim 1, wherein a region of a front surface of the substrate, the region facing the openings, is colored with a hue that has higher reflectivity than the front surface of the boundary portion.

9. A display device comprising:
   a substrate on which at least one light emitting element is mounted;
   a support body that includes a separate opening that is located in front of each of the at least one light emitting element in a direction in which the at least one light emitting element emits light;
   a front member that is mounted in a support recess of the support body; and
   a transmissive display portion that is located in front of the light emitting element and the opening,
   wherein the support body includes a boundary portion that separates each opening from one another, and each of the at least one light emitting element mounted on the substrate faces a corresponding opening, and
   wherein a front facing portion of the front member faces the boundary portion, a front surface of the boundary portion is covered by the front facing portion, and a reflectivity of a front surface of the front facing portion with respect to light emitted from the at least one light emitting element is higher than a reflectivity of the front surface of the boundary portion with respect to the light.

10. The display device according to claim 9, wherein the boundary portion is a rib that divides an elongated hole formed in the support body into the at least one opening and separates each opening from one another, and the rib is a reinforcement rib that is integrally formed with the support body so as to couple long sides of the elongated hole to each other.

11. The display device according to claim 9, wherein the front surface of the front facing portion includes an inclined surface whose lateral distance from a corresponding light emitting element gradually increases in a forward direction away from the light emitting element.

12. The display device according to claim 9, wherein:
   the front member includes at least one front opening that is separated from one another by the front facing portion and an inner wall surface that extends forward from a side of the front opening,
   an entirety of the front member has a hue that has higher reflectivity than the front surface of the boundary portion, and the front member is fixed to the support body, and each of the at least one front opening is located in front of a corresponding one of the at least one light emitting element.

13. The display device according to claim 12, wherein an entirety of the support body has a hue that has lower reflectivity than the front surface of the front facing portion.

14. The display device according to claim 12, wherein, in the support body, the at least one opening that is separated from one another by the boundary portion are arranged in a row, and, in the front member, the at least one front opening that is separated from one another by the front facing portion are arranged in a row.

15. The display device according to claim 12, wherein the support recess is recessed from a front side toward a back side of the support body, and the at least one opening and the boundary portion are formed in a bottom portion at a back side of the support recess.

16. The display device according to claim 9, wherein a region of a front surface of the substrate, the region facing the at least one opening, is colored with a hue that has higher reflectivity than the front surface of the boundary portion.

17. A display device comprising:
    at least one light emitting element;
    a support body that includes a separate opening that is located in front of each of the at least one light emitting element in a direction in which the at least one light emitting element emits light; and
    a front member that is mounted in a support recess of the support body;
    wherein the support body includes a boundary portion that separates each opening from one another, and each of the at least one light emitting element faces a corresponding opening, and
    wherein a front facing portion of the front member faces the boundary portion, a front surface of the boundary portion is covered by the front facing portion, and a reflectivity of a front surface of the front facing portion with respect to light emitted from the at least one light emitting element is higher than a reflectivity of the front surface of the boundary portion with respect to the light.

18. The display device according to claim 17, wherein the front surface of the front facing portion includes an inclined surface whose lateral distance from a corresponding light emitting element gradually increases in a forward direction away from the light emitting element.

19. The display device according to claim 17, wherein:
    the front member includes at least one front opening that is separated from one another by the front facing portion and an inner wall surface that extends forward from a side of the front opening,
    an entirety of the front member has a hue that has higher reflectivity than the front surface of the boundary portion, and
    the front member is fixed to the support body, and each of the at least one front opening is located in front of a corresponding one of the at least one light emitting element.

* * * * *